United States Patent [19]

Sugita

[11] Patent Number: 4,880,511

[45] Date of Patent: Nov. 14, 1989

[54] PROCESS AND APPARATUS FOR RECOVERY OF PRECIOUS METAL COMPOUND

[75] Inventor: Noriyuki Sugita, Kanagawa, Japan

[73] Assignee: Electroplating engineers of Japan, Limited, Tokyo, Japan

[21] Appl. No.: 50,831

[22] Filed: May 16, 1987

[30] Foreign Application Priority Data

May 16, 1986 [JP] Japan .................................. 61-110865
Jul. 10, 1986 [JP] Japan .................................. 61-160760

[51] Int. Cl.$^4$ ........................... C02F 1/46; C02F 1/44; B01D 13/02; B01D 13/00
[52] U.S. Cl. .................................. 204/151; 204/182.4; 204/301; 204/DIG. 13; 210/652; 210/655
[58] Field of Search ............ 204/DIG. 13, 151, 182.3, 204/182.4, 182.5, 152, 149, 301; 210/650, 651, 652, 653, 654, 655

[56] References Cited

U.S. PATENT DOCUMENTS

| | | | |
|---|---|---|---|
| 3,637,467 | 1/1972 | Spatz | 204/14 R |
| 3,674,669 | 7/1972 | Tuwiner | 204/182.4 |
| 3,766,049 | 10/1973 | Smith | 204/301 |
| 3,806,436 | 4/1974 | Tuwiner | 430/32 |

FOREIGN PATENT DOCUMENTS

| | | | |
|---|---|---|---|
| 0051104 | 5/1981 | European Pat. Off. | 210/652 |
| 2242096 | 3/1973 | Fed. Rep. of Germany . | |
| 2085765 | 12/1971 | France . | |
| 2390384 | 12/1978 | France . | |
| 50-075988 | 6/1975 | Japan | 210/652 |
| 50-105547 | 8/1975 | Japan | 204/182.4 |
| 60-031884 | 2/1985 | Japan | 210/652 |
| 1563480 | 3/1980 | United Kingdom . | |

OTHER PUBLICATIONS

R. A. Cross and H. Strattmann, "Barrier Separation Processes", An Introduction to Separation Science, B. L. Karger et al., eds., 1973.
R. G. Donnelly et al., "Reverse Osmosis Treatment of Electroplating Wastes", Plating, (May 1974), pp. 432-442.
J. Eisenmann, "Recovery of Nickel from Plating Bath Rinse Waters by Electrodialysis", Plating and Surface Coating, (Nov. 1977), pp. 34-38.
J. S. Lindstedt et al., "Electrodialysis and Gold Recovery: A Closed-Loop Approach", Plating and Surface Finishing, vol. 69, No. 7, (Jul. 1982), pp. 32-36.
R. W. Birch, "Evaporative Recovery of Gold Solutions", Plating and Surface Finishing, (Apr. 1982), pp. 35-37.
T. S. Govidan et al., "Reverse Osmosis Separation of Some Inorganic Salts in Aqueous Solution Using Acetate Membranes", IZEC Process Design and Development, vol. 5, No. 4, (Oct. 1966), pp. 422-429.
Golomb, A., "Application of Reverse Osmosis to Electroplating Waste Treatment, Part II: The Potential Role of Reverse Osmosis in the Treatment of Some Plating Wastes", Plating, 54(4), (1972), pp. 316-319.
Golomb, A., "Reverse Osmosis for Plating Waste Treatment", Electroplating & Metal Finishing, vol. 10, No. 10, (Oct. 1973), pp. 12-15.
Patent Abstracts of Japan, vol. 5, No. 85, (C-57), 6/3/81, and JP-A-5629697, (Nippon Erekutoropureiteingu Engineers K.K., 3/25/81.
Catalog: Heraeus PCH-C 70, (5 pages).
Ionics, (Recovery of Nickel Salts by Electrodialysis Reversal Process), (6 pages).

Primary Examiner—John F. Niebling
Assistant Examiner—John S. Starsiak, Jr.
Attorney, Agent, or Firm—Flynn, Thiel, Boutell & Tanis

[57] ABSTRACT

A process and an apparatus for recovering a precious metal compound, in which the precious metal compound is separated from impurity metals by use of a reverse osmotic membrane, and the separated precious metal compound is recovered in a concentrated state through electrodialysis employing anion-exchange and cation-exchange membranes, whereby the precious metal compound in a process liquid can be recovered efficiently. When the recovered precious metal compound is added in the as-is form to precious metal plating solution, it is possible to control the plating solution.

12 Claims, 2 Drawing Sheets

PROCESS AND APPARATUS FOR RECOVERY OF PRECIOUS METAL COMPOUND

This invention relates to a process and an apparatus for recovering a precious metal compound. More particularly, the invention relates to a process and an apparatus for recovering efficiently a precious metal compound by the use of a reverse osmotic membrane and anion-exchange and cation-exchange membranes, and to a process and an apparatus for controlling a precious metal plating solution employing the recovery process.

BACKGROUND OF THE INVENTION

Rare precious metals such as gold, silver, palladium and rhodium have been playing an increasingly important role in modern technology, and there has been a keen demand for wasteless and effective utilization and consumption of the precious metals.

In practice, however, various process liquids in precious metal plating processes, such as waste liquids of precious metal plating solutions, wash liquids and stripping solutions, which contain precious metal compounds, have not been so effectively utilized.

Where the precious metal is "gold", for instance, there is known a method of recovering gold from a gold-containing process liquid by electolyzing the liquid to deposit gold on a cathode (see Japanese Patent Application Laid-Open No. 55-164045 (1980)). According to the method, however, gold is recovered in the form of a metal (metallic gold), which needs to be converted through complicated and troublesome reprocessing into gold potassium cyanide or the like for reuse thereof in plating or the like.

There is also known a method of recovering gold contained in a process liquid by adsorbing gold onto an ion-exchange resin or activated carbon. In this method, however, it is not easy, after adsorption of gold on the ion-exchange resin or the like, to recover gold through dissolution thereof; therefore, the thus adsorbed gold has hitherto been recovered by incinerating the ion-exchange resin or the like. Accordingly, the method requires incineration of the expensive ion-exchange resin each time during recovery of the gold, leading to cost problems, and also has the problem that gold is recovered in its metallic form which cannot be easily reused, as in the above-mentioned method.

SUMMARY OF THE INVENTION

An object of this invention is to provide a process and an apparatus for recovering a precious metal compound, by which a precious metal compound can be recovered, solely and in the as-is form, from a process liquid containing the precious metal compound.

Another object of this invention is to provide a process and an apparatus for controlling a precious metal plating solution by adding the recovered precious metal compound to the plating solution.

The above and other objects, features and advantages of this invention will become more apparent from the following description and the accompanying drawings.

DESCRIPTION OF THE PREFERRED EMBODIMENTS

In general, a process liquid in a precious metal plating process, such as a waste liquid of the plating solution, a wash liquid and a stripping solution, contains large amounts of organic acids, impurity metals and the like in addition to the precious metal compound. Therefore, it is necessary first to separate the precious metal compound from the process liquid (liquid to be treated). Paying attention to the fact that a reverse osmotic membrane has permselectivity to precious metal compounds, the present inventors first osmosed the process liquid by a reverse osmotic membrane to thereby separate the precious metal compound solely from the liquid.

Next, for reuse of the thus separated precious metal compound, it is necessary to concentrate the compound while maintaining the form of the compound. Thus, according to this invention, the separated precious metal compound is concentrated by electrodialysis employing anion-exchange and cation-exchange membranes, before recovery thereof. Use of the ion-exchange membranes does not involve the adsorption-and-exchange process as occurring in the case of using an ion-exchange resin, but, instead, involves permeation of ions as they are; namely, cations permeate the cation-exchange membrane, while anions permeate the anion-exchange membrane. As a result, the precious metal compound can be recovered as a concentrate which retains the as-is form of the compound.

In addition, the concentrate obtained by the electrodialysis can be dried by evaporation to recover the precious metal compound in a crystalline of powdery form.

Furthermore, because the precious metal compound can be recovered in its as-is form, regardless of whether it is recovered as a concentrate or in a crystalline or powdery form, the recovered precious metal compound can be added directly to a precious metal plating solution to control the plating solution.

Embodiment 1

Figure 1:
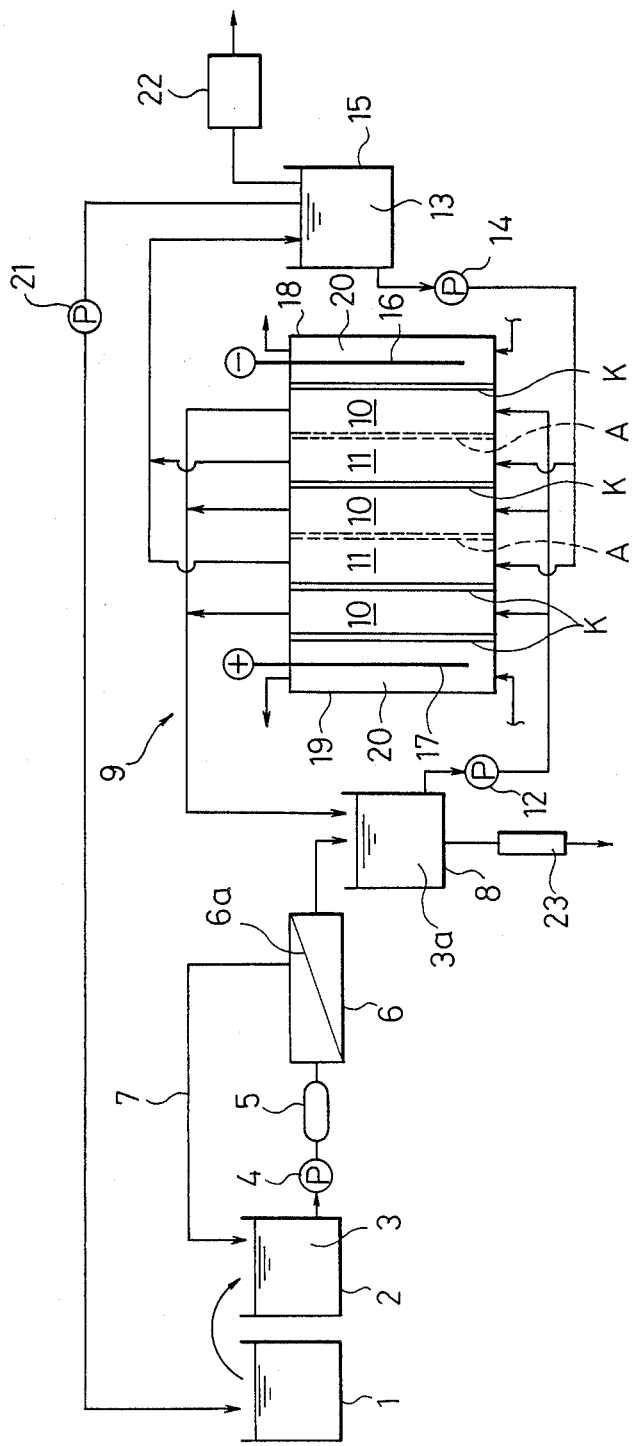
FIG. 1 is a schematic representation of an apparatus for recovery of a precious metal compound according to Embodiments 1 to 4 of this invention.

One embodiment of this invention will now be explained below while referring to the drawing. FIG. 1 illustrates the device for recovery and reuse of gold potassium cyanide, as the "precious metal compound". In the figure, a plating tank 1 is filled with a gold plating solution which contains gold potassium cyanide. A recovery tank 2 contains 100 l of a wash liquid 3 for washing a plated body, as the "process liquid". After plating, the plated body is washed with the wash liquid 3 in the recovery tank 2. A pump 4 and a pre-filter 5 for filtering out solid impurities are provided. A reverse osmotic membrane device 6 comprises a cellulose acetate based reverse osmotic membrane 6a, and the wash liquid 3 is fed into the device 6 under a predetermined pressure by the pump 4. Because the osmotic quantity across the reverse osmotic membrane deice 6 is not so large in view of the properties of the reverse osmotic membrane 6a, of the wash liquid fed under pressure to the device 6, a major portion which does not permeate the membrane 6a is returned into the recovery tank 2 via a circulation line 7. An intermediate tank 8 is provided for momentarily storing 10 l of the liquid 3a osmosed through the reverse osmotic membrane device.

An electrodialysis device 9 comprises dilution chambers 10 and concentration chambers 11 formed by partitioning the interior of the device 9 alternately by anion-exchange membranes A and cation-exchange membranes K. Into the dilution chambers 10 is circulated the wash liquid 3 (osmosed liquid 3a) as a dilute liquid from the intermediate tank 8 by a pump 12, whereas into the concentration chambers 11 is circulated 3.5 l of a dilute solution of potassium hydroxide and potassium cyanide as a concentrated liquid 13 from a concentration tank 15 by a pump 14. On one side of the alternately arranged dilution and concentration chambers 10 and 11 is provided a cathode 16, and on the other end side is provided an anode 17. The cathode 16 and the anode 17 are disposed respectively in electrode chambers 18 and 19, into which a dilute solution of potassium hydroxide as an electrolyte 20 is circulated via a pump (not shown). The membrane facing the anode 17 is constituted of the cation-exchange membrane K to prevent leakage of the cyanogold complex ion.

The concentrated liquid 13 in the concentration tank 15 can be fed appropriately into the plating tank 1 according to the concentration of gold in the plating solution in the tank 1, by a pump 21 provided as a "feeding device".

A drying device 22 is provided such that the concentrated liquid 13 taken out of the concentration tank 15 is subjected to vacuum distillation to crystallize gold potassium cyanide, which is washed with cold water and is dried in a hot air stream to give powdery gold potassium cyanide of high purity.

An ion-exchange resin tower 23 is provided for the final recovery of the remaining low-concentration gold potassium cyanide when the concentration of gold potassium cyanide in the intermediate tank 8 has become extremely low with the progress of the concentration by the electrodialysis device 9.

The operations of the apparatus will now be described in detail below.

Analysis of the wash liquid 3 as the process liquid in the recovery tank 2 revealed that the liquid 3 contained 500 mg/l of gold in the form of gold potassium cyanide, 15 g/l of potassium citrate, 25 mg/l of iron, 25 mg/l of nickel and 10 mg/l of copper. The wash liquid 3 was circulated to the reverse osmotic membrane 6a under a pressure of 28 kg/cm$^2$ by the pump 4 to cause the liquid 3 to gradually permeate the membrane 6a. When the osmosed liquid 3a having just permeated the membrane 6a was analyzed, neither impurity metals such as iron, copper and nickel nor potassium citrate or the like could be detected in the osmosed liquid 3a, and only 1 g/l of gold potassium cyanide could be detected in the liquid. This shows that the cellulose acetate based reverse osmotic membrane 6a has permselectivity to gold potassium cyanide. The liquid 3a thus osmosed through the membrane 3a was then collected into the intermediate tank 8, from which the liquid 3a was circulated to the dilution chambers 10 of the electrodialysis device 9 at a rate of 6 l/min by the pump 12, upon each collection of 10 l into the tank 8. Meanwhile, the concentrated liquid 13 was circulated from the concentration tank 15 into the concentration chambers 11 of the electrodialysis device 9 by the pump 14, and the electrolytes 20 in the electrode chambers 18 and 19 were circulated respectively.

While circulating the osmosed liquid 3a and the concentrated liquid 13 respectively, electrolysis was carried out between the cathode 16 and the anode 17 at a current density of 0.2 A/dm$^2$ for 40 min, and after replacement of the osmosed liquid 3a, the same operation was repeated four times. In the osmosed liquid 3a, gold potassium cyanide is dissociated to potassium ions and cyanogold complex ions, and when an electric current is passed through the liquid, the potassium ions in the dilution chamber 10 permeate the cation-exchange membrane K into the concentration chamber 11, whereas the cyanogold complex ions permeate the anion-exchange membrane A on the opposite side into the concentration chamber 11. Therefore, both the potassium ions and the cyanogold complex ions constituting gold potassium cyanide move successively from the dilution chambers 10 into the concentration chambers 11, resulting in that gold potassium cyanide in the osmosed liquid 3a is steadily concentrated into the concentrated liquid 13. Thus, although the gold concentration in the osmosed liquid 3a in the intermediate tank 8 before concentration was only 1 g/l, the concentrated liquid 13 in the concentration tank 15 was found, by analysis, to contain gold in a high concentration of 11 g/l in the form of gold potassium cyanide.

The above test results are summarized in the following table.

|  | Process liquid | Osmosed liquid | Concentrated liquid |
| --- | --- | --- | --- |
| Gold | 500 mg/l | 1 g/l | 11 g/l |
| Potassium citrate | 15 g/l | — | — |
| Iron | 25 mg/l | — | — |
| Nickel | 25 mg/l | — | — |
| Copper | 10 mg/l | — | — |

The concentration of gold potassium cyanide in the osmosed liquid 3a can be detected from the applied voltage and the electrical conductivity, whereby the end point of ion exchange can be known.

Gold potassium cyanide can be supplied and the gold plating solution can be controlled, by sequentially returning the concentrated liquid 13 into the plating tank 1 by the pump 21. Further, a gold plating solution can be newly prepared by adding predetermined additives to the concentrated liquid 13 itself.

Moreover, the concentrated liquid 13 may be dried by the drying device 22 to give powdery gold potassium cyanide, which may be added to the plating tank 1 or may be used to prepare newly a plating solution.

Embodiment 2

A waste liquid from gold plating, in place of the wash liquid 3, was treated directly as the process liquid while using the same apparatus and conditions as in Embodiment 1, except that electrolysis was conducted only two times. The test results are summarized in the following table.

|  | Process liquid | Osmosed liquid | Concentrated liquid |
| --- | --- | --- | --- |
| Gold | 5 g/l | 7.2 g/l | 41 g/l |
| Potassium citrate | 200 g/l | 0.1 g/l | 0.6 mg/l |
| Iron | 200 mg/l | 0.2 mg/l | 1 mg/l |

|        | Process liquid | Osmosed liquid | Concentrated liquid |
|--------|---------------|----------------|---------------------|
| Nickel | 300 mg/l      | 0.4 mg/l       | 2.5 mg/l            |

Because the process liquid was the waste liquid from plating, the concentrations of components in the process liquid were high, and a little potassium citrate and the like remained in the concentrated liquid, but the concentrations of the residual impurities were so low that there occurred no problem.

Embodiment 3

Tests were carried out by changing the kind of gold plating solution, that is, by using as the process liquid a wash liquid in non-cyanide-based gold plating instead of the cyanide-based gold plating solution. Gold was contained in the plating solution in the form of gold sodium sulfite. As the concentrated liquid in the electrodialysis device 9, a dilute aqueous solution of sodium hydroxide and sodium sulfite was used. The other conditions were the same as in the preceding embodiment. The test results are summarized in the following table.

|                | Process liquid | Osmosed liquid | Concentrated liquid |
|----------------|---------------|----------------|---------------------|
| Gold           | 400 mg/l      | 900 mg/l       | 10 g/l              |
| Sodium sulfite | 3 g/l         | —              | —                   |
| Iron           | 15 mg/l       | —              | —                   |
| Nickel         | 30 mg/l       | —              | —                   |

The components such as sodium sulfite were found to be entirely removed, after osmosis through the reverse osmotic membrane 6a.

Embodiment 4

Tests were carried out in relation to silver plating, by using a wash liquid of a silver plating process as the process liquid. Silver was contained in the plating solution in the form of potassium silver cyanide. As the concentrated liquid, a dilute aqueous solution of potassium hydroxide and potassium cyanide was used. The test results are summarized in the following table.

|                  | Process liquid | Osmosed liquid | Concentrated liquid |
|------------------|---------------|----------------|---------------------|
| Silver           | 4 g/l         | 8 g/l          | 90 g/l              |
| Citric acid      | 10 g/l        | —              | —                   |
| Organophosphate  | 20 g/l        | —              | —                   |
| Iron             | 15 mg/l       | —              | —                   |
| Nickel           | 30 mg/l       | —              | —                   |

Citric acid and the like components were found to be entirely removed, on osmosis through the reverse osmotic membrane 6a.

Embodiment 5

Figure 2:
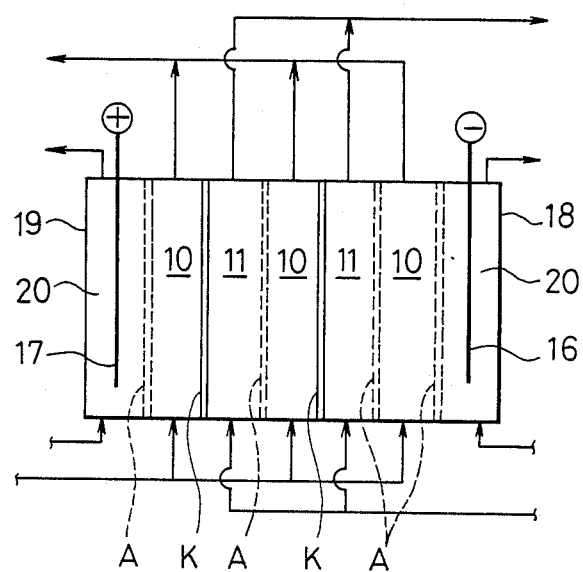
FIG. 2 is a schematic representation of an apparatus for recovery of a precious metal according to Embodiment 5 and 6 of this invention.

Tests were carried out in relation to rhodium plating, by using as the process liquid a wash liquid in a rhodium plating process. Rhodium was contained in the plating solution in the form of rhodium sulfate. As the concentrated liquid, a dilute aqueous solution of sulfuric acid was used. Due to the relationship between ions, the arrangement of the anion-exchange and cation-exchange membranes in the electordialysis device in the case of rhodium plating is reverse to that in the above-mentioned cases, as shown in FIG. 2. The test results are summarized in the following table.

|               | Process liquid | Osmosed liquid | Concentrated liquid |
|---------------|---------------|----------------|---------------------|
| Rhodium       | 300 mg/l      | 750 mg/l       | 8.6 g/l             |
| Sulfuric acid | 1.8 g/l       | —              | —                   |
| Iron          | 30 mg/l       | —              | —                   |
| Nickel        | 10 mg/l       | —              | —                   |

Sulfuric acid and the like components were found to be entire removed, on osmosis through the reverse osmotic membrane 6a.

Embodiment 6

Tests were carried out in relation to palladium plating, by using as the process liquid a wash liquid in a palladium plating process. Palladium was contained in the plating solution in the form of diamino-palladium dinitrite. As the concentrated liquid, a dilute aqueous solution of aqueous ammonia and sodium nitrite was used. The arrangement of ion-exchange membranes as shown in FIG. 2 was used for palladium plating, as in the case of rhodium plating. The test results are summarized in the following table.

|                | Process liquid | Osmosed liquid | Concentrated liquid |
|----------------|---------------|----------------|---------------------|
| Palladium      | 1.5 g/l       | 2 g/l          | 23 g/l              |
| Sodium nitrite | 0.3 g/l       | —              | —                   |
| Sodium nitrate | 5.0 g/l       | —              | —                   |
| Iron           | 5 mg/l        | —              | —                   |
| Nickel         | 5 mg/l        | —              | —                   |

Sodium nitrite and the like components were found to be entirely removed, on osmosis through the reverse osmotic membrane 6a. Almost the same test results can be obtained also where palladium is contained in a palladium plating solution in the form of palladousamine chloride.

As in the above embodiments, the "precious metal compound" is not limited to gold potassium cyanide but may be gold sodium sulfite, potassium silver cyanide, rhodium sulfate, palladousamine chloride, diamino-palladium nitrite or the like. Namely, the precious metal compound can be recovered solely and in its as-is form, not accompanied by various components or other metals which are contained in the plating solution, and the recovered precious metal compound can be sequentially added to the plating tank 1. Also, the recovered precious metal compound can be converted into a crystalline or powdery form by the drying device. Further, the process liquid is not limited to the waste liquid from plating or the wash liquid but may be any other liquid that contains a precious metal compound, such as a stripping solution for platings. Moreover, although a cellulose acetate based reverse osmotic membrane 6a was mentioned by way of example in the above embodiments, other types of reverse osmotic membranes can also be used.

Embodiment 7

Figure 3:
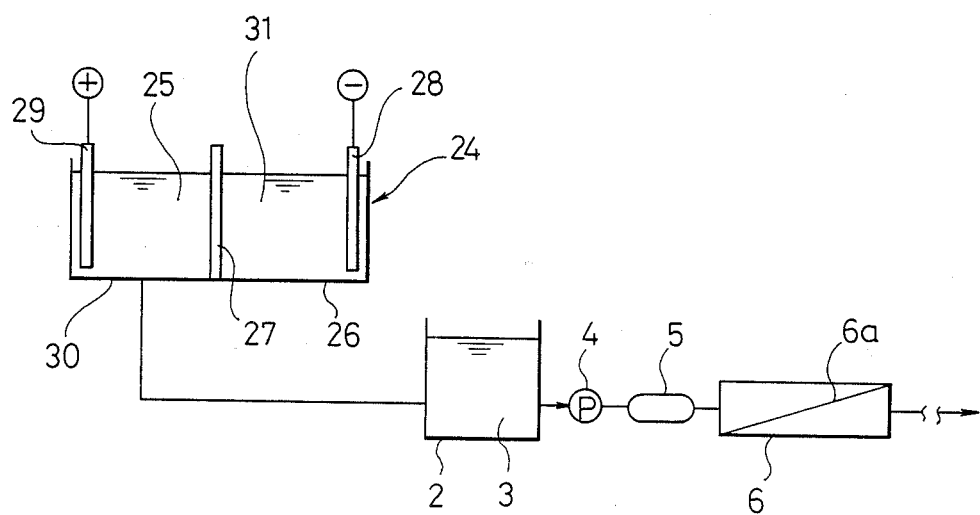
FIG. 3 is a schematic representation of a cyanide treating tank according to Embodiment 7, in the state of being disposed on the upstream side of and connected to a reverse osmotic membrane device.

In this embodiment, the process liquid to be treated in the reverse osmotic membrane device 6 shown in FIG. 1 is a concentrated cyanide solution, namely a waste liquid of a gold potassium cyanide based plating solution or a stripping solution which contains a large amount of free cyanide. The waste liquid from plating is subjected to a pretreatment to decompose sufficiently the free cyanide, thereby enhancing the efficiency of separation of impurity metals by the reverse osmotic membrane device 6. The pretreatment is carried out using a cyanide treating tank 24 shown in FIG. 3. In the cyanide treating tank 24, the process liquid (waste liquid from plating) 25 and a cathode chamber 26 are separated from each other by a cation-exchange membrane 27 so that the process liquid 25 does not make contact with a cathode 28 and, therefore, gold is not deposited as metal from the process liquid 25. Numeral 29 denotes an insoluble anode such as a carbon electrode and a ferrite electrode, numeral 30 an anode chamber, and numeral 31 an electrolyte such as an aqueous potassium hydroxide solution. When electrolysis is conducted under the condition where the waste liquid from plating as the process liquid 25 is added to the anode chamber 30 of the cyan treating tank 24 whereas the aqueous potassium hydroxide solution is added to the cathode chamber 26, the free cyanide undergoes oxidative decomposition on the anode 29. However, gold is not deposited as metallic gold but remains dissolved as ions. After the free cyanide only is sufficiently decomposed in the cyanide treating tank 24, the process liquid 25 is fed to the reverse osmotic membrane device 6 shown in FIG. 1 to separate gold potassium cyanide and impurity metals contained in the process liquid 25 from each other, and the osmosed liquid (aqueous solution of gold potassium cyanide) 3a from the device 6 is subjected to electrodialysis in an electrodialysis device 9.

According to this embodiment, the efficiency in separating the impurity metals in the reverse osmotic membrane device 6 was high even where the waste liquid from plating was treated as the process liquid. Furthermore, since gold was not in the metallic state, the electrodialysis in the electrodialysis device 9 could also be performed efficiently, as in Embodiment 1.

Embodiment 8

A waste liquid from plating was selected as the process liquid, as in the preceding embodiment. After a chelating agent is added to the waste liquid to form complex salts with metals other than gold potassium cyanide, the resultant liquid was treated sequentially by the reverse osmotic membrane device 6 and the electrodialysis device 9 shown in FIG. 1 in the same manner as in Embodiment 1. If the waste liquid pretreated for decomposing or neutralizing the free cyanide contains considerable amounts of impurity metals as cyano-complexes, the impurity metals cannot be easily separated by the reverse osmotic membrane device 6. On the other hand, when the impurity metals are present in other forms of metal ions than cyano-complexes, it is possible to separate the impurity metals efficiently by the reverse osmotic membrane device 6. In view of this point, a chelating agent have a chelate formation constant for the impurity metals higher than that of cyan was added to the waste liquid to convert the impurity metals from the cyano-complexes thereof into complexes thereof with the chelating agent.

In this embodiment, the impurity metals in the waste liquid from plating (concentrated cyan solution) were preliminarily converted from cyano-complexes into other form of complexes by the addition of the chelating agent and, accordingly, it was possible to separate efficiently gold potassium cyanide from the impurity metals by the reverse osmotic membrane device 6.

Then, the thus separated gold potassium cyanide was subjected to electrodialysis in the electrodialysis device 9, whereby it was possible to recover gold potassium cyanide in a concentrated state, as in Embodiment 1.

Incidentally, when the pretreatment described in Embodiment 8 is carried out after the pretreatment described in Embodiment 7, it is possible to separate and concentrate gold potassium cyanide (precious metal compound) more securely.

The process and the apparatus for recovery of a precious metal compound according to this invention, as has been described hereinabove, make it possible to recover the precious metal compound, solely and in the as-is form of the compound, either as a concentrated liquid or in a crystalline or powdery form, from a process liquid containing a variety of components and other metals. Furthermore, the process and the apparatus are profitable on an economical basis because the ion-exchange membranes used therein can be used for a long period of time without needing regeneration, unlike ion-exchange resins.

In addition, according to the process and apparatus for controlling a precious metal plating solution as has been described above, it is possible to use the recovered precious metal compound directly for controlling the plating solution, which is more profitable, on an economical basis, than the recovery of the precious metal compound through conversion of the compound into a metallic form.

I claim:

1. A process for recovering a precious metal compound, comprising separating a precious metal compound contained in a process liquid by a reverse osmosis membrane, concentrating said separated precious metal compound by electrodialysis employing anion-exchange and cationexchange membranes, and recovering said precious metal compound in a concentrated liquid obtained by said electrodialysis, wherein said process liquid is a concentrated cyanide solution containing a large amount of free cyanide, said concentrated cyanide solution having been pretreated in a cyanide treating tank comprising an anode chamber and a cathode chamber separated from each other by a cation-exchange membrane so that said concentrated cyanide solution placed in said anode chamber does not make direct contact with said cathode, thereby causing oxidative decomposition of said free cyanide on said anode.

2. An apparatus for recovering a precious metal compound, comprising:

a reverse osmosis membrane device for selective permeation of only a precious metal compound contained in a process liquid, an electrodialysis device employing anion-exchange and cation-exchange membranes for concentrating the osmosed liquid obtained by said reverse osmosis membrane device, which apparatus further comprises a cyanide treating tank comprising an anode chamber and a cathode chamber separated from each other by a cation-exchange membrane, said cyanide treating tank performing electrolysis under the condition where a concentrated cyanide solution containing a large amount of free cyanide is added to said anode chamber as said process liquid and an electrolyte is added to said cathode chamber so that only said free cyanide is decomposed by said electrodialysis, and said cyanide treating device is disposed on the upstream side of and connected to said reverse osmosis membrane device.

3. An apparatus according to claim 2, wherein the reverse osmosis membrane of said reverse osmosis membrane device is a cellulose acetate membrane.

4. An apparatus for controlling a precious metal plating solution, comprising:
a reverse osmosis membrane device for selective permeation of only an osmosed liquid of a precious metal compound contained in a process liquid,
an electrodialysis device employing anion-exchange and cation-exchange membranes for concentrating the osmosed liquid obtained by said reverse osmosis membrane device, and
a feeding device for sequentially adding said concentrated liquid obtained by said electrodialysis device to a precious metal plating liquid, which apparatus further comprises a cyanide treating tank comprising an anode chamber and a cathode chamber separated from each other by a cation-exchange membrane, said cyanide treating tank performing electrolysis under the condition where a concentrated cyanide solution containing a large amount of free cyanide is added to said anode chamber as said process liquid and an electrolyte is added to said cathode chamber so that only said free cyanide is decomposed by said electrodialysis, said cyanide treating device being disposed on the upstream side of and connected to said reverse osmosis membrane device.

5. A process for controlling a gold plating solution, comprising contacting an aqueous waste process liquid from a gold electroplating process and containing gold potassium cyanide and metal impurities resulting from the electroplating process, with a cellulose acetate reverse osmosis membrane which is relatively permeable to an aqueous solution of gold potassium cyanide and is relatively impermeable to the metal impurities, whereby to separate an aqueous solution of gold potassium cyanide from the remainder of said process liquid, concentrating said separated aqueous solution containing gold potassium cyanide by electrodialysis employing anion-exchange and cation-exchange membranes, recovering said separated gold potassium cyanide and sequentially adding said recovered gold potassium cyanide to a gold plating solution, said process liquid having been pretreated in a cyanide treating tank comprising an anode compartment and a cathode compartment separated from each other by a cation-exchange membrane in a manner such that said process liquid does not make direct contact with the cathode, thereby causing oxidative decomposition of free cyanide on the anode, prior to being fed to said reverse osmosis membrane.

6. A process for recovering an aqueous solution of gold potassium cyanide from an aqueous waste process liquid from an electroplating process and comprising gold potassium cyanide and cyanide complexes of impurity metals, comprising adding a chelating agent to said process liquid to convert the cyanide complexes of impurity metals into complexes thereof with said chelating agent, separating a first aqueous solution of gold potassium cyanide from the impurity metal chelate complexes by reverse osmosis, and concentrating said first aqueous solution of separated gold potassium cyanide by electrodialysis employing anion-exchange and cation-exchange membranes to obtain a second aqueous solution having a higher concentration of gold potassium cyanide.

7. The process of claim 6, wherein said process liquid is treated in a cyanide treating tank comprising an anode compartment and a cathode compartment separated from each other by a cation-exchange membrane in a manner such that said process liquid does not make direct contact with the cathode, thereby causing oxidative decomposition of free cyanide on the anode, prior to the addition of the chelating agent.

8. A process for recovering an aqueous solution of a precious metal compound from an aqueous process liquid containing said precious metal compound and metal impurities, wherein said precious metal is selected from the group consisting of gold, silver, rhodium and palladium and said precious metal compound is selected from the group consisting of gold sodium sulfite, potassium silver cyanide, rhodium sulfate, diamino palladium dinitrite and palladous amine chloride, which comprises: contacting said process liquid, under reverse osmosis conditions, with a reverse osmosis membrane which is permeable to a first aqueous solution of said precious metal compound from the remainder of said process liquid containing said metal impurities; and then subjecting said first aqueous solution of said precious metal compound to electrodialysis employing anion-exchange and cation-exchange membranes to obtain a second aqueous solution having a higher concentration of said precious metal compound than said first aqueous solution.

9. A process as claimed in claim 8, including the step of evaporating water from said second aqueous solution and recovering said precious metal compound in a crystalline or powdery form.

10. A process as claimed in claim 8 wherein said aqueous process liquid is a waste process liquid from a process for electroplating objects with said precious metal using a precious metal electroplating solution, and including the step of adding said second aqueous solution to the precious metal electroplating solution.

11. A process for recovering a precious metal compound, comprising separating a precious metal compound contained in a process liquid by a reverse osmosis membrane, concentrating said separated previous metal compound by electrodialysis employing anion-exchange and cation-exchange membranes, recovering said precious metal compound in a concentrated liquid obtained by said electrodialysis, and subjecting said concentrated precious metal compound to drying by evaporation to recover said precious metal compound in a crystalline or powdery form, wherein said process liquid is a concentrated cyanide solution containing a large amount of free cyanide, said concentrated cyanide solution having been pretreated in a cyanide treating tank comprising an anode chamber and a cathode chamber separated from each other by a cation-exchange membrane so that said concentrated cyanide solution placed in said anode chamber does not make direct contact with said cathode, thereby causing oxidative decomposition of said free cyanide on said anode.

12. A process according to claim 8 or 9, wherein said reverse osmosis membrane is a cellulose acetate reverse osmosis membrane.

* * * * *

UNITED STATES PATENT AND TRADEMARK OFFICE
CERTIFICATE OF CORRECTION

PATENT NO. : 4 880 511
DATED : November 14, 1989
INVENTOR(S) : Noriyuki SUGITA

It is certified that error appears in the above-identified patent and that said Letters Patent is hereby corrected as shown below:

On the title page, at item [22] change the date to ---May 14, 1987---.

Column 10, line 24; after "compound" insert ---and is impermeable to said metal impurities whereby to separate said first aqueous solution of said precious metal compound---.

Signed and Sealed this

Nineteenth Day of February, 1991

Attest:

HARRY F. MANBECK, JR.

*Attesting Officer*     *Commissioner of Patents and Trademarks*